United States Patent [19]

Johnson et al.

[11] Patent Number: 5,012,452
[45] Date of Patent: Apr. 30, 1991

[54] PULSE TRANSFORMATION SONAR

[75] Inventors: Clarence S. Johnson, San Diego; Clarence G. Blanc, Escondido, both of Calif.

[73] Assignee: The United States of America as represented by the Secretary of the Navy, Washington, D.C.

[21] Appl. No.: 249,080

[22] Filed: May 1, 1972

[51] Int. Cl.$^5$ .............................................. H04K 3/00
[52] U.S. Cl. ...................................... 367/1; 367/131; 367/87
[58] Field of Search ...................... 340/1 R, 3 R, 5 R; 343/5 SA, 5 DP; 324/77 B, 77 D; 367/1, 87, 131

[56]  References Cited
U.S. PATENT DOCUMENTS

| | | | |
|---|---|---|---|
| 2,948,879 | 8/1960 | Papberg, Jr. et al. | 367/137 |
| 3,176,262 | 3/1965 | Ehrlich et al. | 367/126 |
| 3,363,226 | 1/1968 | Murphree | 367/115 |
| 3,380,018 | 4/1968 | Littrell et al. | 367/901 |
| 3,715,509 | 2/1973 | Dawson | 324/77 B |

Primary Examiner—Daniel T. Pihulic
Attorney, Agent, or Firm—Harvey Fendelman; Thomas Glenn Keough

[57] ABSTRACT

A transducer projects bursts of ultrasonic energy having broadbandwidths substantially identical to the energy pulses transmitted by a porpoise or dolphin. Immediately prior to the projection of the broadband ultrasonic signals, a range gate pulse is transmitted which, necessarily, first reaches the target and is reflected back toward a hydrophone carried adjacent the transducer-projector. At the termination of the reflected range gate pulse, the reflected broadband ultrasonic signals are gated into a pulse stretcher. During the relatively long intervals between the time that successive bursts of the broadband ultrasonic signals are projected or received, the pulse stretcher functions to translate and divide the broadband ultrasonic signals into signals lying within the audio spectrum. Due to the uniquely connected analog-to-digital, buffer storage, and digital-to-analog circuit components, the translation from the ultrasonic spectrum to the audio spectrum is done in a real-time basis to provide an audio representation having substantially the same information content as the ultrasonic signals.

9 Claims, 1 Drawing Sheet

5,012,452

PULSE TRANSFORMATION SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Frequency translation from a higher frequency to a lower frequency conventionally employs a heterodyning technique. However, where broadband high-frequency energy is to be brought into, for example, the audio spectrum, only a portion of these signals can be so translated since the audio spectrum has a much smaller bandwidth than the high-frequency signals. A variation of using a single heterodyning circuit is to employ a plurality of heterodyning circuits each adapted for shifting down a contiguous portion of the high-frequency broadband signals. Even if such a contiguous separation of the information signal is feasible, a designer is confronted with the problem of balancing the magnitudes and phases of the shifted signals to provide a valid representation in the audio spectrum. These design obstacles are but two confronting marine scientists who desire to analyze the ultrasonic signals projected and received by porpoises. The frequency range transmitted and received by a porpoise contains frequency components from less than 2 kilohertz to in excess of 100 kilohertz. Unfortunately, because of the unsuitability of heterodyning techniques, the human operator has been locked out of the real-time analysis of the reflected ultrasonic signal since the range of human hearing only reaches from about 20 hertz to 15 kilohertz. Further analysis problems arise since the porpoise transmits this broadband ultrasonic signal at varying rates from as few as one-at-random to as many as 400 pulses per second. When a porpoise begins a run at a target, the pulse rate is low. As it nears its target, the pulse rate approaches a maximum of 400 pulses per second. The reflected components of the higher rate signals contain increasing by greater amounts of information such as size, speed, bearing, etc., to allow the porpoise to approach and capture, for example, an evasively maneuvering bait fish as it attempts to escape. The broadband porpoise pulses have been synthesized in the laboratory and spectral analyses have been made in an effort to discover which frequency components contribute most significantly toward providing meaningful target information. An information pulse stretching technique is needed to utilize the entire echoing cycle to allow an operator to have a real-time analysis of the ultrasonic signals within the audio spectrum.

SUMMARY OF THE INVENTION

The present invention is directed to providing a system permitting the audio analysis of broadband ultrasonic energy. A means for projecting pulses of broadband ultrasonic energy is positioned adjacent a means for receiving reflected pulses of the broadband ultrasonic energy. The receiving means is connected to a dividing-and-translating means which shifts the entire bandwidth of the reflected pulses of the broadband ultrasonic energy into the acoustic spectrum in real-time. A readout is coupled to receive the energy now shifted into the acoustic spectrum to provide a real-time representation of the acoustic spectrum.

Therefore, it is an object of the invention to provide a system employing real-time signal translation.

Yet another object is to provide a system permitting the real-time audio analysis of the ultrasonic spectrum.

Still another object is to provide a system employing serially connected analog-to-digital, storage, and digital-to-analog circuitry for ensuring the real-time translation of ultrasonic energy to the audio spectrum.

Yet another object is to provide a system specifically designed to allow the real-time audio analysis of the ultrasonic pulses emitted by marine mammals.

These and other objects of the invention will become more readily apparent from the ensuing specification when taken with the drawings.

DESCRIPTION OF THE PREFERRED EMBODIMENT

Figure 1:
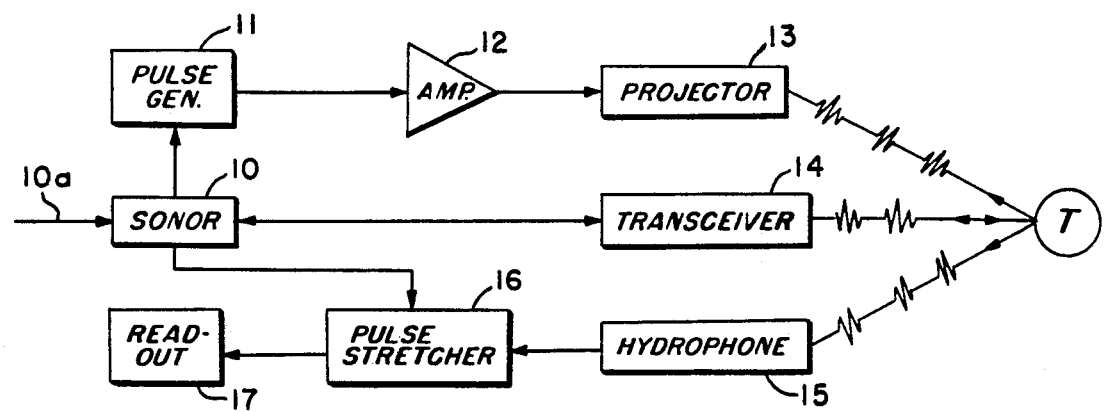
FIG. 1 is a block diagram of the system.
Figure 2:
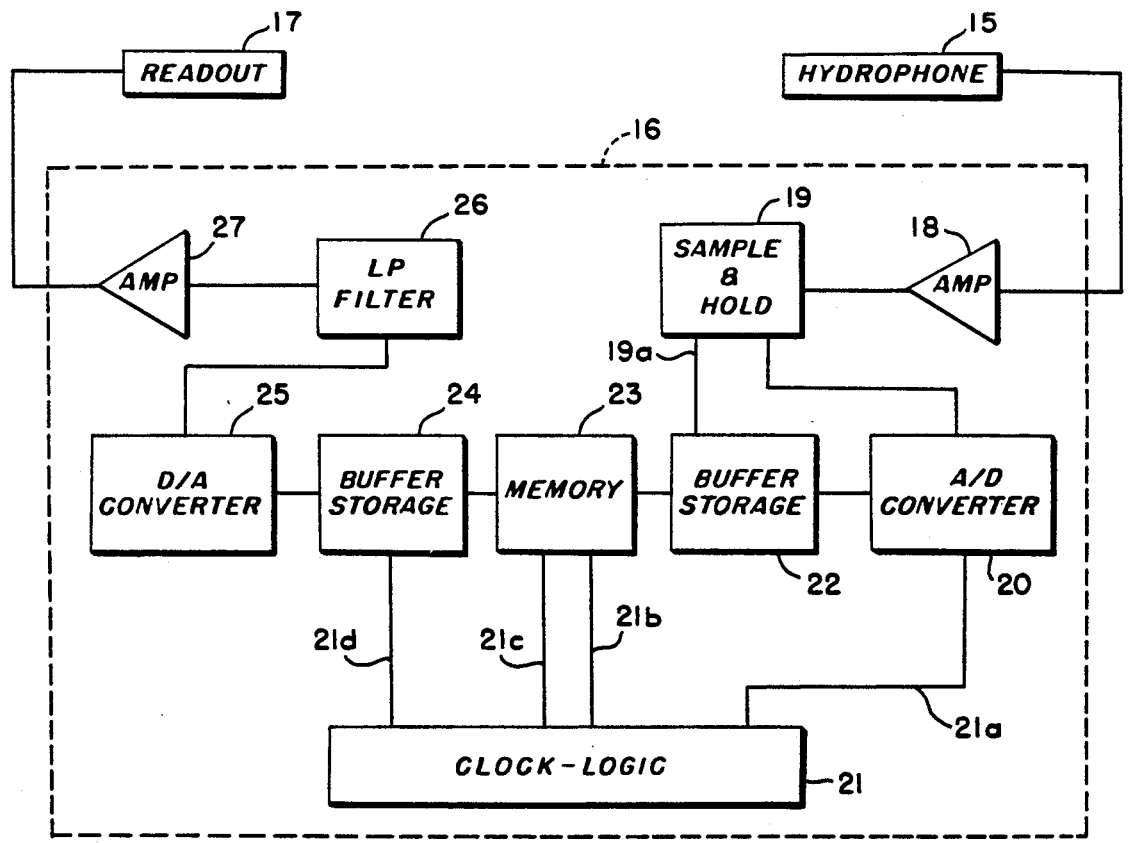
FIG. 2 is a block diagram of the pulse stretcher of FIG. 1.

Referring to the drawings, FIG. 1 shows in block diagram form the system for synthesizing signals substantially identical to the broadband ultrasonic signals transmitted and received by porpoises and dolphins. It is known that porpoises send and receive pulses having a bandwidth of from 2 kilohertz to 100 kilohertz each having a duration of from 10 to 20 microseconds. It has been noted experimentally that the echo reflected from the target has a duration of less than 0.5 milliseconds for most targets of interest. Since the maximum anticipated pulse rate is 400 pulses per second it follows that there is a 1/400 or 2.5 millisecond gap between pulses. Meaningful data is reflected for a period of less than 0.5 of a millisecond with a 2.5 millisecond duration between pulses. Thus, dividing the pulses by a factor of five would lower the frequency range of the translated signal to between 400 hertz to 20 kilohertz. If the pulse repetition rate is held to 200 pulses per second a 5.0 millisecond gap is created allowing the translated frequency range to be lowered from between 20 kilohertz to 10 kilohertz. A pulse repetition rate of 100 pulses per second would produce a 10 millisecond gap and a translated frequency range of 100 kilohertz to 5 kilohertz.

A sonar 10, for example a Model 510 Range Sonar marketed by the Kettenburg Marina Supply Company of San Diego, Calif. is initiated as schematically shown by initiation arrow 10a to emit sequential bursts of 200 kilohertz acoustic energy. The 200 kilohertz signal is fed to a range gate transducer-transceiver 14 which transmits each burst as a range gate pulse. At the end of each range gate pulse, sonar 10 actuates a pulse generator 11 and, in accordance with its programming, a pulse of broadband ultrasonic energy synthesizing a porpoise's 2 kilohertz to 100 kilohertz signal is generated.

In the present embodiment, a Hp 330A pulse generator marketed by the Neely Corporation of San Diego, Calif. is used to provide the desired ultrasonic energy signal having a pulse duration of 10 to 20 microseconds. The burst of ultrasonic energy is suitably amplified through an amplifier 12 and fed to a ferroelectric or magnetostrictive transducer 13. Since the range gate pulse was transmitted first, a target "T" receives the impinging range gate pulse and reflects it back toward range gate transducer transceiver 14 and also toward a hydrophone 15 disposed adjacent projector-transducer 13. Upon receipt of the reflected pulse the range gate transducer feeds back a signal to sonar 10 which reinitiates the aforedescribed sequence. Immediately after the range gate echo reaches the hydrophone, the reflected pulses of broadband ultrasonic energy are gated into pulse stretcher 16.

Broadly stated, a frequency dividing and translating operation is effected calling for the pulse stretcher's converting reflected broadband signals into an electric analog. This analog is sampled and converted to binary numbers in an A to D converter and stored in a buffer storage and memory unit. At the completion of the storage period, the stored binary numbers are removed sequentially from the memory bank and converted back to an analog form having a lower frequency and bandwidth that is a fraction of or which forms a ratio with the reflected broadband signals. The ratio is determined by the sampling rate and the readout rate.

After the pulse stretching process, the processed signal is passed to a readout 17 providing an audio and-/or visual representation of the reflected pulses of broadband acoustic energy now within the audio spectrum. The "gaps" formerly between bursts of broadband signals now are filled. Since laboratory scientists are able to control the magnitude, duration and spectral content of the ensonifying pulse of broadband energy, a real time analysis is provided by the visual and audio readout allowing a representative analysis of the pulses emitted by porpoises and dolphins of the reflected energy. Thus, the reflected energy from target "T" may be visually and audioly monitored and compared as the target is towed, stationarily positioned, or oriented differently and the different frequency patterns showing the most variation are identifiable to allow improvement of existing long and short range sonars.

The unique manner in which a broadband ultrasonic pulse having a bandwidth from, for example, less than 2 kilohertz to in excess of 100 kilohertz is divided and translated into the audio spectrum reaching from 20 hertz to 15 kilohertz with a nearly complete information transfer will be more thoroughly explained in a manner sufficient to allow one skilled in the art to make and use the present invention concept.

Looking now to the specifics of the pulse stretcher, a range gate amplifier 18 is coupled to receive the range gate echoes and the reflected pulses of broadband ultrasonic energy. In its least complicated form, the range amplifier is no more than an electronic switch, which upon the reception and termination of the range gate echo self actuates to gate through the reflected broadband ultrasonic signals. The circuitry by which this operation is accomplished is well known in a goodly variety of configurations and a specific embodiment has been dispensed with to avoid belaboring the obvious for such devices are readily tailored to function as desired once the circuit parameters are known.

Leave it suffice to say that after the termination of the range gate echo, range gate amplifier 18 is open only for the duration of the reflected broadband signals and after the termination of each burst of reflected signals, the gate is closed to block spurious signals from interferring with the frequency translation process. It naturally follows that the precise time when the range gate amplifier is open and closed is a function of the duration of the expected pulses.

The gated reflected pulses of broadband signals are fed to a sample and hold amplifier 19 which samples the reflected pulse in accordance with the Nyquist sampling rate, that being at least two samples per cycle of the highest frequency component in the broadband signals in order to reproduce a representive waveform of the reflected signals. The more samples per cycle the better the reproduction. In this case, the sampling rate was set a 500 kilohertz which provides five samples per cycle of the 100 kilohertz maximum expected signal although only two samples would be required for substantial waveform synthesis. The specific unit used as the sample and hold circuit is a model SHA II marketed by Analog Devices, Inc. of Cambridge, Mass. Sampling commences upon the receipt of a reflected pulse of broadband signals at the 500 kilohertz rate.

The sampled signals are fed to a following analog-to-digital converter 20. The converter selected to function in the instant application was an ADC-8F marketed by Analog Devices, Inc. of Cambridge, Mass. The ADC-8F utilizes a method of successive approximations to do a conversion. This method is analogous to weighing an unknown weight against a series of known standards on a balance. The heaviest standard is used first and is left on unless it is too heavy and overbalances the unknown. The next standard is exactly half the weight of the first and it is added and then removed if it is too much. Each successive standard is half the previous one and the weighing proceeds until the weighing has been determined with sufficient accuracy, that is, all the weights have been used.

The ADC-8F unit chosen includes two sections, an analog section from which the aforedescribed weighing process is derived and a second section for providing the representative responsive digital output number. The binary pulse trains representative of the incoming analog signals are gated by a clock-logic circuit 21 which operates the analog-to-digital converter from a base frequency of 500 kilohertz. Clock-logic circuitry for providing the appropriate gating signals are well known and in widespread use throughout the art with their fabrication and electrical interconnection governed only by different types signals being processed and the desired results.

Following the analog-to-digital converter, a buffer storage 22, here a model BFD-12 marketed by Analog Devices, Inc. of Cambridge, Mass., receives the pulse trains to help isolate transients and to hold the digital pulse trains prior to their being gated into memory unit 23. Note a lead is shown schematically interconnecting the buffer storage to the sample and hold circuit to ensure their mutual synchronization during the sampling, quantizing, and analog-to-digital conversion. Memory unit 23 is included in the pulse stretcher circuit to provide the necessary time delay and storage to allow the signal's translation into a lower frequency spectrum, the audio spectrum. The memory unit chosen was 8 interconnected 256 bit Intel Number 1101 random-access-memory elements marketed by Intel Corporation of Mountain View, Calif. The purpose and function of the memory unit is to store the digital pulse trains during the relatively long intervals between the times that the broadband ultrasonic signals are received.

Clock pulses generated in clock logic unit 21 are fed to the memory unit through lead 21c to gate the stored digital pulse trains to the following buffer storage 24 during the long intervals between receipt of the digital information which is representative of the broadband ultrasonic signals. For example, the 500 kilohertz sampled reflected pulses of broadband signals are gated into and stored in terms of representative digital pulse trains by 500 kilohertz signals fed to the memory unit on output lead 21b. However, these digital pulse trains are gated out of the memory unit 23 into buffer storage 24 at a rate 1/5 of the in-gating rate, or at 100 kilohertz. This lower out-gating rate is performed during the interval when there is no additional incoming broadband signals. A following digital-to-analog converter 25, for example, a DAC-8T converter marketed by Pastoriza Electronics, Inc. of Newton Upper Falls, Mass. is similarly gated at this lower rato to translate the signals back to analog form at a rate 1/5 that of the original analog-to-digital conversion. As mentioned above, if the pulse repetition rate of the broadband signals is 100 pulses per second (not 400 pulses per second), then a duration of 10 milliseconds will exist between successive pulses of broadband signals. In this circumstance, a frequency dividing factor of 50 can be introduced to achieve a complete retrieval of information of the broadband signals and a consequent lowering of the out-gating rate of the digital-to-analog converter 25 by a factor of 50. Thus an out-gating rate of 10 kilohertz is fed to the digital-to-analog converter to effect the complete frequency translation and division to the audio spectrum.

With these reduction factors of 5 or 50, memory unit 23 must possess sufficient storage capabilities to hold the data during the reduction process and a following buffer storage 24, interposed to block the transfer of transients, both must be gated via clock logic leads 21c and 21d by a frequency which would effect this reduction, namely frequency of 100 kilohertz, or 10 kilohertz respectively. The buffer storage 24 is substantially the same as buffer storage 22 and a following digital-to-analog converter 25 is a DAC-8T converter marketed by Passtoriza Electronics, Inc. Of Newton Upper Falls, Mass. The converter consists of three elements, an input register, a digital-to-analog converter, and an output amplifier. The register is used to store temporarily each train of digital pulses representative of a word from the memory. Synthesizing an analog signal representative of the digital pulse trains occurs in the D to A converter element section and an output amplifier provides an output signal which is actually a boxcar representation of the analog input signal appearing at the output of range gate amplifier 18. For this reason, it has been found advantageous to include a low pass filter 26 after the digital to analog converter in order to reduce the boxcar analog to a true analog signal. A following amplifier boosts the power of the analog signal and a readout is presented at readout 17.

A frequency translation of the entire broadband ultrasonic signal is thusly presented in the audio spectrum. With the pulse repetition rate being at a lower rate a more satisfactory translation into the lower audio spectrum can be obtained.

The invention fabricated in accordance with the above teachings puts an operator "back in the loop" of information analysis. Heretofore, tape recordings of porpoise sonar pulses were made and later played back at a lower speed so that the echoes were brought within the audio spectrum. Now, however, with the real-time analysis capability provided by this invention, more responsive, firsthand monitoring is feasible at a substantial research cost savings.

Obviously, many modifications and variations of the present invention are possible in the light of the above teachings, and it is therefore understood that within the scope of the disclosed inventive concept, the invention may be practiced otherwise than specifically described.

What is claimed is:

1. A system permitting the audio analysis of broadband ultrasonic energy comprising:
    means for projecting pulses of said broadband ultrasonic energy;
    means for receiving reflected pulses of said broadband ultrasonic energy;
    means connected to the receiving means for dividing the entire bandwidth of said reflected pulses of said broadband ultrasonic energy and for translating its information content into the acoustic spectrum; and
    means coupled to the dividing and translating means for providing a real-time representation of said acoustic spectrum.

2. A system permitting the audio analysis of broadband ultrasonic energy comprising:
    means for projecting pulses of said broadband ultrasonic energy;
    means for receiving reflected pulses of said broadband ultrasonic energy;
    means for transmitting a range gate signal immediately prior to the projection of each pulse of broadband ultrasonic energy and for responding to each echo of said range gate signal for enabling said receiving means to receive only said reflected pulses of said broadband ultrasonic energy;
    means connected to the receiving means for dividing the entire bandwidth of said reflected pulses of said broadband ultrasonic energy and for translating its information content into the acoustic spectrum; and
    means coupled to the dividing and translating means for providing a real-time representation of said acoustic spectrum.

3. A system according to claim 2 in which said system is interconnected to ensure that each said pulse of said broadband ultrasonic energy is projected immediately at the termination of each range gate signal and said receiving means is enabled immediately at the termination of each said echo of said range gate signal.

4. A system according to claim 3 in which the projecting means is transducer-projector, said receiving means is a hydrophone and the providing means is an audio-visual readout.

5. A system according to claim 4 in which the dividing and translating means includes,
    analog-to-digital means actuated at a first rate sufficient to capture the information content of said reflected pulses of said broadband ultrasonic energy to provide representative first digital pulse trains,
    means connected to said analog-to-digital means for storing said first digital pulse trains, and
    digital-to-analog means joined to the storage means for gating therefrom said first digital pulse trains at a second rate lower in frequency than said first rate to provide representative signals in the audio spectrum.

6. A system according to claim 5 in which said dividing and translating means further includes,
    a first buffer storage driver means interposed between said analog-to-digital means and said storage means for isolating transient signals and a second buffer storage driver means interposed between said storage means and said digital-to-analog means for isolating transient signals thereacross.

7. A system according to claim 6 further including:
control means operatively connected to said transducer projector, the range gate transmitting means and said dividing and transmitting means for effecting said audio analysis.

8. A system according to claim 7 in which said dividing and translating means further includes,
a range gate amplifier coupled to receive said reflected pulses of said broadband ultrasonic energy and for passing them to said analog-to-digital means and
a low pass filter coupled to receive the representative signals in the audio spectrum for providing a smoother audio signal.

9. A system according to claim 8 in which said control means is coupled to said range gate amplifier to pass each said reflected pulses of said broadband energy upon the termination of each said echo of said range gate signal.

* * * * *